April 7, 1964     J. S. DRYBREAD, SR     3,127,808
TOGGLE BOLT
Filed June 18, 1962
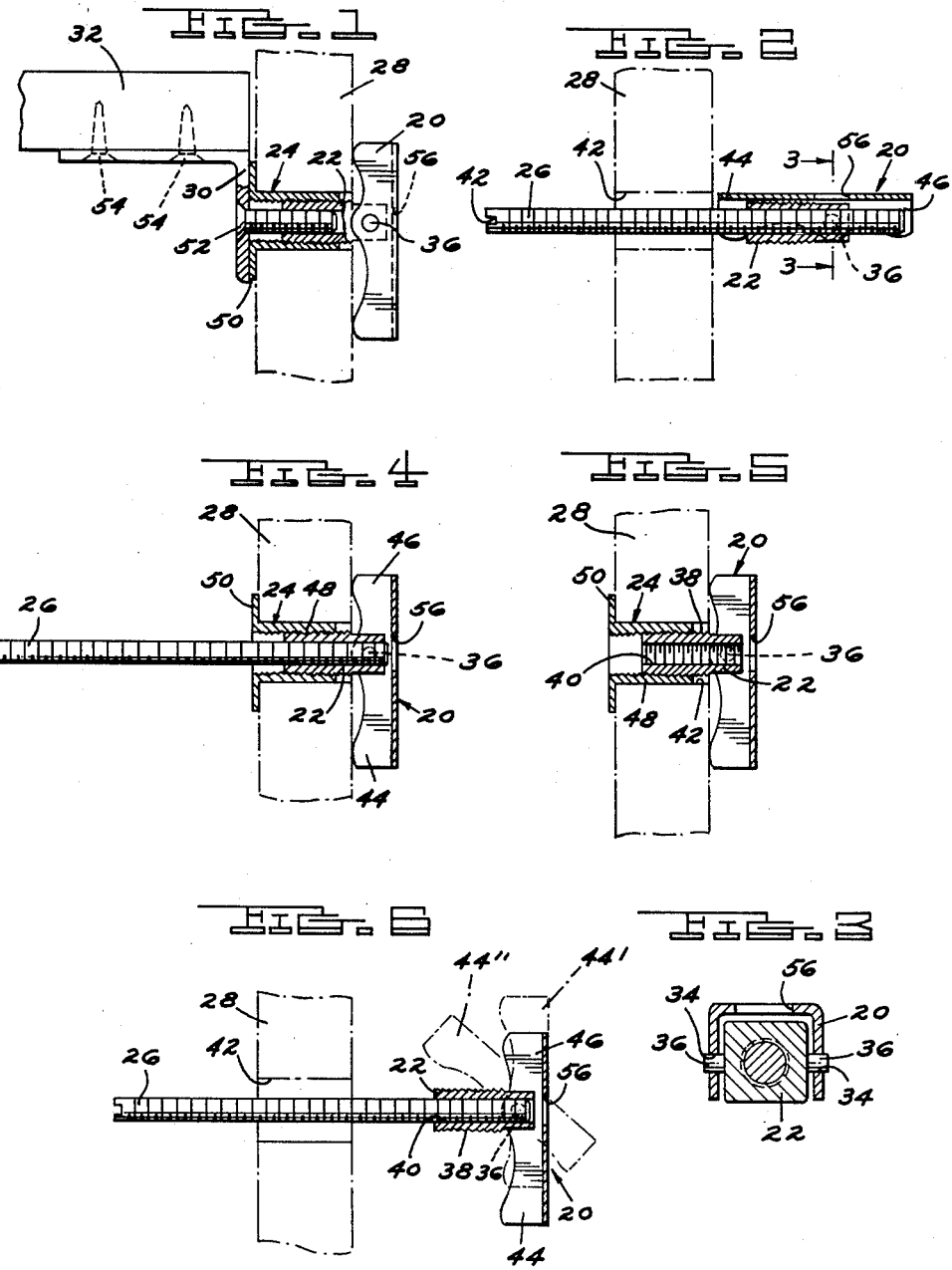
INVENTOR.
JOHN S. DRYBREAD, SR.
BY
*Burton & Parker*
ATTORNEYS

United States Patent Office 3,127,808
Patented Apr. 7, 1964

3,127,808
TOGGLE BOLT
John S. Drybread, Sr., R.R. 4, Box 325, Winamac, Ind., assignor of one-half to Bernice L. Drybread (Mrs. John S. Drybread, Sr.), Winamac, Ind.
Filed June 18, 1962, Ser. No. 203,320
1 Claim. (Cl. 85—3)

This invention relates to an improved device for fastening objects to hollow walls and the like and in particular to such a device of the type commonly known as a toggle bolt.

The general object of my invention is the provision of an improved toggle bolt assembly comprising a minimum of parts of simple construction wherein the assembly may be retained positioned within an aperture through a hollow structure such as a wall or the like independently of the supporting bolt which is used to secure the object to such structure.

A further object is the provision of a toggle bolt assembly which may be quickly and conveniently removed from the wall and repositioned at a different location without losing the toggle head within the hollow wall during removal of the assembly from the wall.

A more specific object of the invention is the provision of a toggle bolt assembly comprising a toggle nut with the toggle head pivoted thereto, an insertion screw and a holder, wherein the insertion screw cooperates with the nut to carry the toggle head through the wall and hold the head in position while the holder is secured to the toggle head nut, with the insertion screw being thereafter removable, leaving the toggle secured to the wall. A concomitant object is the provision of such a toggle bolt assembly wherein the insertion screw may be repositioned within the nut, and the holder thereupon disengaged from the nut whereby the screw may be used to withdraw the toggle head and the toggle head nut from the wall without losing the head within the hollow wall space.

Other objects, advantages and meritorious features will more fully appear from the following specification, claims and appended drawings, wherein:

FIG. 1 is a longitudinal sectional view of a toggle bolt embodying my invention showing the toggle bolt in assembled position for securing an object to a wall or the like;

FIG. 2 is a longitudinal sectional view showing the toggle head supported by the insertion screw being positioned through an aperture in the wall;

FIG. 3 is a cross sectional view taken along line 3—3 of FIG. 2;

FIG. 4 is a longitudinal sectional view showing the holder received over the insertion screw and engaged on the toggle head nut;

FIG. 5 is a sectional view similar to FIG. 4 with the insertion screw removed; and FIG. 6 is a longitudinal sectional view showing the insertion screw engaged with the toggle head nut for removal of the toggle head from the wall.

Referring now to the drawings, there is shown a toggle bolt assembly generally comprising a toggle head 20, a toggle head nut 22, a holder 24 and an insertion screw 26. Such a toggle bolt is adapted to attach an object to a structure such as a wall shown at 28 in the drawings. Referring to FIG. 1, the toggle bolt may be utilized to attach a bracket 30 to wall 28, which bracket in turn supports a shelf or the like 32.

The toggle head 20 is preferably channel-shaped in cross section as shown in FIG. 3, having aligned apertures 34 through opposite legs of the channel, through which pins 36 on toggle head nut 22 project to pivotally secure the head 20 to the nut 22. This pivotal connection allows the head 20 to swing from the longitudinal position shown in FIG. 2 to the transverse position shown in FIGS. 1, 4, 5 and 6. Adjacent one end of the toggle head nut 22 are the projecting pins 36, and spaced toward the opposite end of the nut, it is provided with an externally threaded length 38 and an internally threaded length 40. Insertion screw 26 has an external thread engageable with the internal threads 40 on nut 22 and is preferably provided at its outer end with a transverse slot 42 for engagement with a screwdriver.

Head 20 and nut 22 are furnished to the user in assembled condition. Preferably the head 20 is mounted eccentrically upon nut 22, as shown, so as to pivot by gravity to its transverse position when properly inserted into the wall, as hereinafter more fully described. When it is desired to use the toggle bolt a hole 42 is drilled in wall 28, and the insertion screw 26 threaded into nut 22. As shown in FIG. 2, head 20 is pivoted to lie longitudinally along nut 22, with the longer end 44 overlying the nut. In this position the head will not swing about its connection with the nut. To further assure that the head 20 will remain in the position shown in FIG. 2 during insertion through hole 42, insertion screw 26 may be threaded past the end of nut 22 into position adjacent the shorter end 46 of head 20.

When the toggle head 20 is positioned as shown in FIG. 2, insertion screw 26 may be partially retracted from toggle head nut 22 to permit swingable movement of the head 20 about the nut 22. The whole assembly of FIG. 2 is then rotated 180 degrees, disposing the longer end 44 of the head underlying the nut 22, from which it will swing by gravity to a position transversely of the nut. The insertion screw 26 with the nut and head is then pulled outwardly to engage the opposite ends 44 and 46 of the head against the inaccessible surface of wall 28 as shown in FIG. 4.

Holder 24 has an internally threaded shank 48 cooperable with the external threads 38 on nut 22, and is provided with an outer flange 50 which may be of polygonal configuration suitable for engagement with a wrench or like tool. With members 20, 22 and 26 positioned as above described, holder 24 is slid axially over screw 26 and is positioned within hole 42 for threaded engagement with the nut 22. As holder 24 is engaged on nut 22, screw 26 may be grasped and tensioned away from the wall 28 to hold toggle head 20 firmly against the wall surface and prevent it from rotating. Once flange 50 of holder 24 is tightened against the wall, the insertion screw 26 may be removed, leaving the self-supporting assembly of head 20, nut 22 and holder 24 secured to the wall as shown in FIG. 5. Although the engagement of head 20 and holder flange 50 against opposite surfaces of the wall will serve to hold the toggle in position, additional support is provided if the shank 48 of holder 24 closely fits the hole 42 in wall 28. Therefore it is preferable to drill hole 42 having a diameter closely approximating the diameter of shank 48.

With the toggle bolt embodying my invention positioned as shown in FIG. 5, a threaded bolt 52 cooperable with the internal threads 40 of toggle head nut 20 may be inserted through a suitable aperture in L-shaped bracket 30 to firmly secure the bracket to wall 28. By first assembling bracket 30 and shelf 32 by means of screws 54 or the like, the shelf may be easily installed. As shown in the drawings, head 20 has an aperture 56 therethrough which is in axial alignment with nut 22 when the head is positioned in its transverse condition. Thus the bolt 52 (FIG. 1) may be longer than is shown, and can project completely through nut 22 and toggle head 20. This construction obviates the necessity of providing special length bolts 52 and prevents a longer bolt from abutting head 20. If aperture 56 were not provided, use of a long bolt 52 would prevent bracket 30 from being drawn securely against holder flange 50, which obviously would be undesirable.

From the foregoing it can be seen that there is provided a toggle bolt assembly which may be installed and secured within a wall or the like completely independently of the means such as bolt 52 used to fasten the object to the wall. Hence the toggle bolt assembly may be first installed, and the object such as bracket 30 and shelf 32 may then be mounted merely by inserting bolt 52 into the toggle. The bracket and shelf may later be removed and replaced as desired without disturbing the toggle bolt assembly or having to install a new toggle bolt.

In the event it becomes necessary or desirable to remove the toggle bolt assembly completely from the wall, this may be conveniently accomplished without loss of the toggle head, as is the case with many toggle bolt constructions in general use. To remove the assembly, the bolt 52 is unscrewed, and bracket 30 removed. Insertion screw 26 is then threaded into toggle head nut 22, and while holding screw 26, holder 24 is unthreaded from nut 22 and slid axially over screw 26 for removal. Insertion screw 26 with head 20 and nut 22, is then inserted slightly farther into the wall, as shown in FIG. 6. This moves head 20 away from the surface of wall 28. The entire assembly is then rotated 180 degrees until the longer portion 44 of head 20 is projecting upwardly, as indicated in phantom at 44' of FIG. 6. Toggle head 20 will now swing on pivots 36 through the position indicated at 44" until it assumes its position extending longitudinally of nut 22 and screw 26, as shown in FIG. 2. In this position the members 20, 22 and 26 may be easily withdrawn through hole 42 in wall 28. None of the parts of the toggle bolt assembly are lost in the inaccessible space behind wall 28, and thus may be used over and over again.

Once the toggle assembly is removed, the hole 42 may be plugged and covered.

What I claim is:

A toggle bolt assembly for securing an object to a wall or the like having an aperture therethrough, comprising: a toggle head nut having an externally threaded length adjacent one end thereof and an internal bore exhibiting a threaded length opening through the opposite end thereof; a toggle head pivotally mounted on said nut adjacent said opposite end for swingable movement about said end from a position longitudinally juxtaposing the nut for insertion of the nut and head through said wall aperture to a position transversely of the nut to overlie marginal edges of said aperture; said toggle head being pivotally mounted closer to one of its ends than the other and having an aperture in axial alignment with and larger than the nut bore when the head is positioned in its transverse position to permit a threaded bolt to pass completely through said nut and head; and a sleeve-like holder having an internally threaded length engageable with the external threads of said nut and a radially outwardly extending flange portion at one end thereof, said holder being receivable within said wall aperture for engagement with said toggle head nut to draw the toggle head and the holder flange respectively against opposite surfaces of said wall adjacent the aperture whereby the toggle assembly including the nut, head and holder is retained in the wall independently of an object to be secured to the wall thereby.

References Cited in the file of this patent

UNITED STATES PATENTS

| | | |
|---|---|---|
| 1,003,527 | Smith | Sept. 19, 1911 |
| 1,162,803 | Parkes | Dec. 7, 1915 |
| 1,326,959 | Paine | Jan. 6, 1920 |